Nov. 3, 1959 G. G. WENTWORTH 2,910,799
ARTICULATED FISHING LURE
Filed Sept. 4, 1957
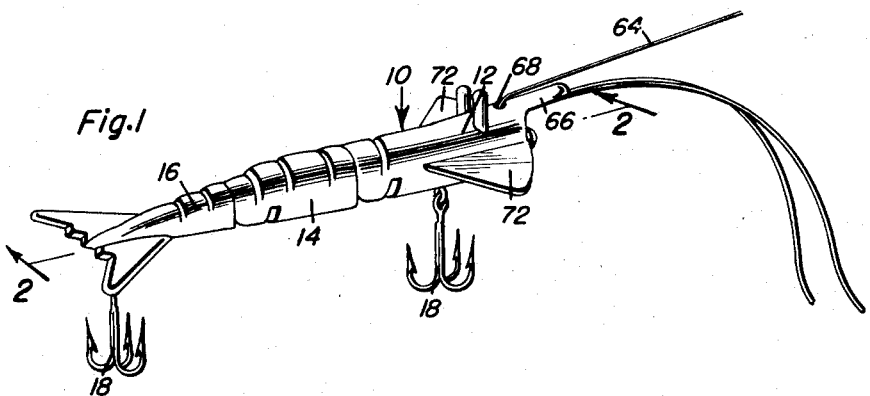
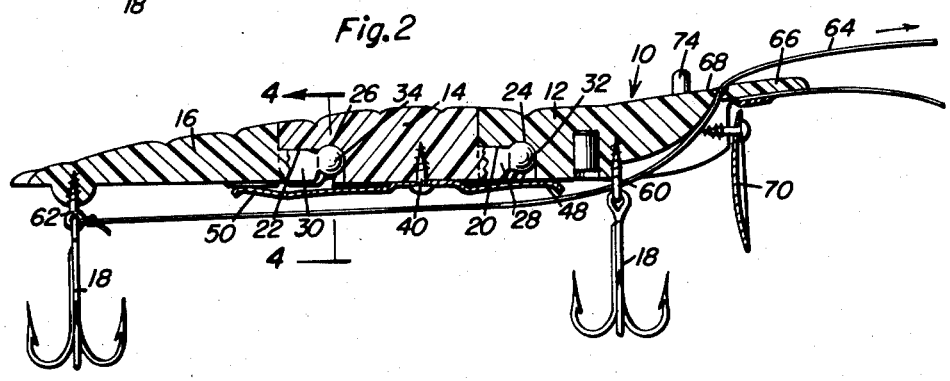
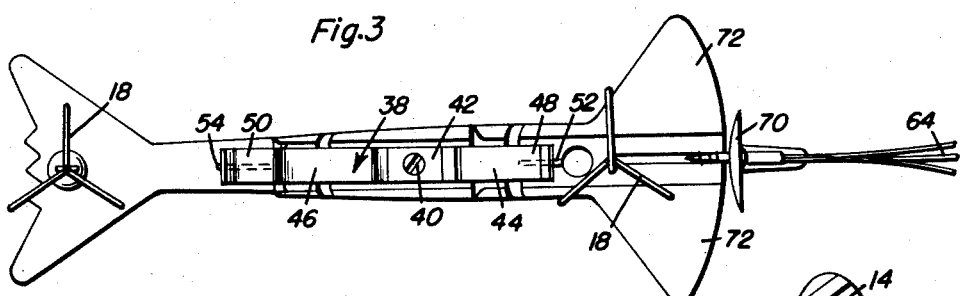
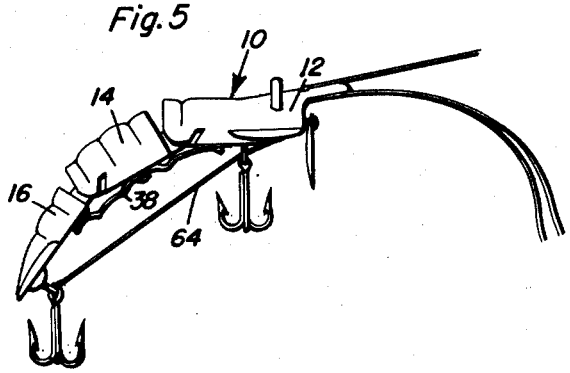
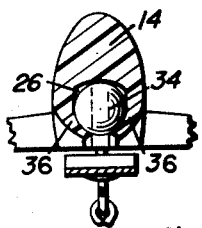
Gerald G. Wentworth
INVENTOR.

United States Patent Office 2,910,799
Patented Nov. 3, 1959

2,910,799

ARTICULATED FISHING LURE

Gerald G. Wentworth, Houston, Tex.

Application September 4, 1957, Serial No. 682,030

3 Claims. (Cl. 43—42.02)

This invention comprises a novel and useful articulated fishing lure and more specifically relates to an animated fishing lure consisting of hinged segments enabling the angler to control the lure in close imitation of the movements of a shrimp or other bait lure.

The primary object of this invention is to provide a fishing lure which will by the relative motion of its parts and its movement in the water, closely simulate the action of a natural prey of fish.

A further important object of the invention is to provide a fishing lure having pivotally connected articulated segments enabling the various portions of the body of the lure to be capable of independent movement.

Yet another object of the invention is to provide an articulated fishing lure in conformity with the preceding objects wherein a single fishing line attached to the lure may be employed both to control the movement of the lure in the water as well as to control the articulated components of the lure as to their relative motions.

These together with other objects and advantages which will become subsequently apparent reside in the details of construction and operation, as more fully hereinafter described and claimed, reference being had to the accompanying drawing forming a part hereof, wherein like numerals refer to like parts throughout, and in which:

Figure 1 is a perspective view showing by way of illustration only a preferred embodiment of fishing lure incorporating therein the principles of this invention;

Figure 2 is a vertical longitudinal sectional view through the lure of Figure 1 and showing the articulated construction of the lure together with the manner for attaching the fishing line to the lure;

Figure 3 is a bottom plan view of the articulated lure of Figures 1 and 2, the cooperative attachment of a flexing spring for yieldingly urging the articulated components of the lure into their normal position;

Figure 4 is a vertical transverse sectional view taken upon an enlarged scale substantially upon the plane indicated by the section line 4—4 of Figure 2 and showing the hinged connection of the segmental lure; and Figure 5 is a side elevational view of the lure of Figures 1–4, but showing the same in a bowed or bent position of the articulated components of the lure during operation of the same.

Referring now more specifically to the embodiment illustrated in the drawings, it will be seen that the animated lure in accordance with this invention consists of a body indicated generally by the numeral 10 and which body may be constructed of any suitable material and preferably established to simulate the natural prey of a fish, as a shrimp or the like. This body includes a front component 12, a middle portion 14 and a tail portion 16, conventional hooks 18 being secured to one or more of these body components in accordance with conventional practice.

It will be observed by special reference to Figure 2 that these components are pivotally connected together or articulated as by a hinged connection at the bottom portion of these sections. By means of this construction, the sections may be bowed or articulated downwardly as shown in Figure 5, although the body is normally yieldingly and resiliently retained with the sections in longitudinal alignment upon a common longitudinal axis, in the natural position of the bait which the lure simulates, by means of a resilient element in a manner to be subsequently set forth.

Referring now especially to Figure 2 it will be seen that the rear ends of the two sections 12 and 14 are provided with cavities 20 and 22 on their lower end portions, which open to their bottom surfaces, and which at the forward end have spherical depressed seats 24 and 26 respectively. At their forward ends, the sections 14 and 16 in turn have forwardly projecting stem or neck portions 28 and 30 which in turn terminate in spherical ends 32 and 34 respectively, the latter seating in and having pivotal movement in the recesses or seats 24 and 26. As shown in Figure 4, the spherical recesses or sockets 26 for the middle section 14 and 24 for the forward section 12 have their lower side walls inturned as at 36 to provide lips tending to retain the enlarged ball portions 34 and 32 respectively. As will be understood, a similar ball and socket construction is provided for the engagement of the front and middle sections.

A leaf spring member 38 is secured to the underside of the body of the device, being attached thereto as by a screw 40 secured to the midsection 14. This spring may be of any suitable shape, as illustrated having a depressed central portion 42 with a pair of slightly laterally offset front and rear end portions 44 and 46 respectively. The end portions are inturned as at 48 and 50 whereby when the spring is secured to the bottom surface of the midbody portion 14, its ends will yieldingly bear against the undersides of the front and rear portions 12 and 16 to yieldingly urge the latter up into pivotal alignment with the central portion 14. As will now be understood, the engagement of the stem or neck portions 28 and 30 with the bottom walls of the recesses 20 and 22 together with the abutment of the end portions of the front and middle sections 12 and 14 with the front portions of the middle and rear sections 14 and 16, respectively, will constitute stop means which will limit upward pivoting movement of the sections to a straight line position as shown in Figures 1 and 2.

As will be best observed from Figure 3, the underside of the front and rear body portions 12 and 16 are provided with centrally disposed longitudinally extending ribs 52 and 54 which constitute raised surfaces against which the ends 48 and 50 of the spring are slidably engaged. This construction provides the necessary abutment for the ends of the resilient spring members, and facilitates sliding action of the same upon the underside of the front and rear sections of the body of the device, thereby reducing friction and facilitating the articulated action of the sections with respect to each other.

A pair of eye screws 60 and 62 are secured to the undersides of the front and rear sections 12 and 16 and serve the dual function of securing the hooks 18 thereto, and also are operatively associated with a fishing line 64.

As will be best observed from Figures 1 and 2, the forward portion of the front section 12 has a forwardly extending relatively flat nose portion 66, having an aperture 68 extending vertically therethrough. The line 64 extends from this aperture, then through the eye 60, and is secured to the rear eye 62.

Below the nose portion 66, the forward portion of the body may be provided with a vertically extending spoon or wobbler blade 70. In addition, a pair of outwardly extending vanes or wings 72 are provided and a pair of upstanding knobs or projections 74 are also provided upon the upper surface of the front portion of the body.

The operation of this device is as follows: With the device in the water, the spoon 70 at the forward end of the same and in advance of the center of gravity of the body will impart a dancing, skipping and erratic wobbling motion to the lure rendering it very attractive to fish. As the line 64 is tensioned, between the aperture 68 and its attachment to the rear eye hook 62, it will tend to flex the articulated body against the resistance of the spring 38, as shown in Figure 5. Thus a life-like writhing motion may be imparted to the body thereby very closely simulating the action of a natural prey of a fish, in addition to the skipping action imparted by the spoon 70.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishing lure comprising an elongated body having longitudinally disposed front, middle and tail sections, means disposed between and pivotally connecting the adjacent ends of said sections at their lower portions for relative vertical swinging movement, a leaf spring operatively engaging each of said sections at its bottom surface for yieldingly urging said sections into longitudinal alignment upon a common axis, each pair of adjacent sections having cooperating abutting surfaces limiting pivotal movement of said sections by said spring, a line secured to said lure and operatively connected to said front and tail sections for effecting upon tension of said line relative pivotal movement of said sections against the resistance of said spring, wherein said connecting means comprises a ball and socket connection.

2. A fishing lure comprising an elongated body having longitudinally disposed front, middle and tail sections, means disposed between and pivotally connecting the adjacent ends of said sections at their lower portions for relative vertical swinging movement, a leaf spring operatively engaging each of said sections at its bottom surface for yieldingly urging said sections into longitudinal alignment upon a common axis, each pair of adjacent sections having cooperating abutting surfaces limiting pivotal movement of said sections by said spring, a line secured to said lure and operatively connected to said front and tail sections for effecting upon tension of said line relative pivotal movement of said sections against the resistance of said spring, wherein said connecting means comprises a ball and socket connection, each pair of adjacent sections having on the underside of the rear portion of the forward section a channel and a socket recess and the underside of the rear section of said pair of adjacent sections has a forwardly projecting stem and ball received in said channel and socket recess.

3. A fishing lure comprising an elongated body having longitudinally disposed front, middle and tail sections, means disposed between and pivotally connecting the adjacent ends of said sections at their lower portions for relative vertical swinging movement, a leaf spring operatively engaging each of said sections at its bottom surface for yieldingly urging said sections into longitudinal alignment upon a common axis, each pair of adjacent sections having cooperating abutting surfaces limiting pivotal movement of said sections by said spring, a line secured to said lure and operatively connected to said front and tail sections for effecting upon tension of said line relative pivotal movement of said sections against the resistance of said spring, said connecting means comprising a ball and socket connection, each pair of adjacent sections having on the underside of the rear portion of the forward section a channel and a socket recess and the underside of the rear section of said pair of adjacent sections having a forwardly projecting stem and ball received in said channel and socket recess, the walls of said socket recess being bent inwardly to embrace and retain said ball.

References Cited in the file of this patent

UNITED STATES PATENTS

| | | |
|---|---|---|
| 2,663,964 | Martin | Dec. 29, 1953 |
| 2,770,063 | Martin | Nov. 13, 1956 |
| 2,791,859 | Wentworth | May 14, 1957 |